Aug. 25, 1936.    D. W. SHERMAN    2,052,535
AUTOMOBILE FRAME
Filed March 26, 1936    3 Sheets-Sheet 2

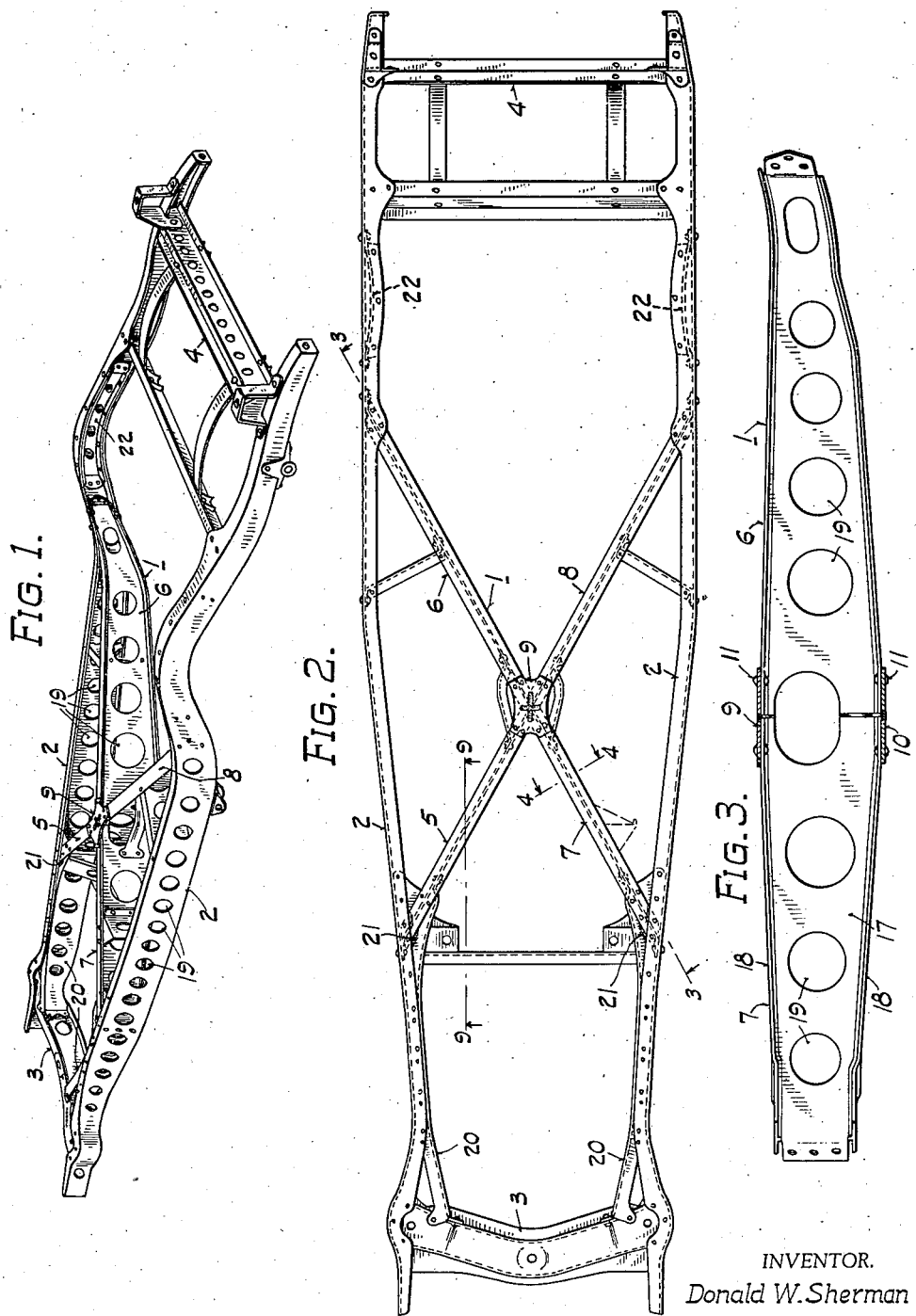

INVENTOR.
Donald W. Sherman
BY
ATTORNEY.

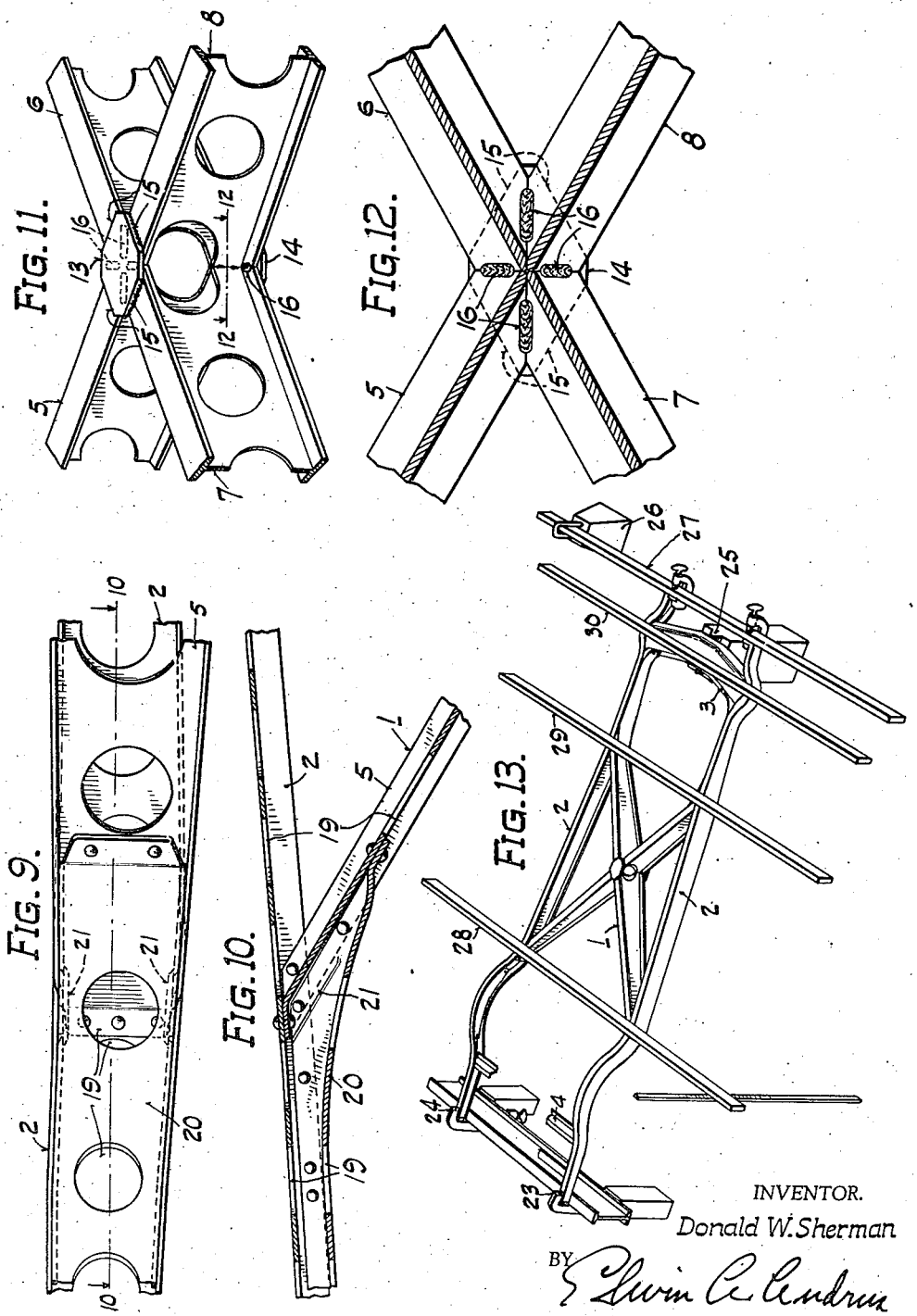

Patented Aug. 25, 1936

2,052,535

UNITED STATES PATENT OFFICE 2,052,535

AUTOMOBILE FRAME

Donald W. Sherman, Shorewood, Wis., assignor to A. O. Smith Corporation, Milwaukee, Wis., a corporation of New York Application March 26, 1936, Serial No. 70,944

12 Claims. (Cl. 280—106)

This invention relates to an automobile and more particularly to an automobile frame.

An object of the invention is to provide a commercial automobile chassis frame having much greater torsional stiffness in proportion to its weight and cost than chassis frames used heretofore.

Another object of the invention is to provide an automobile in which the chassis frame performs substantially all of the mechanical functions of strength and rigidity, and wherein the automobile body acts chiefly as an enclosure for the passengers.

Another object of the invention is to provide an automobile which can be driven over uneven road surfaces with greater ease and safety than automobiles used heretofore.

Another object of the invention is to provide an automobile which retains the "new car feeling" throughout its life by virtue of freedom from body squeaks and rattles, and absence of body deterioration.

Another object of the invention is to provide an automobile having structural features which permit better insulation to be used between the body and chassis frame, preventing chassis and road noises from being transmitted into the body structure.

The automobile frames heretofore used commercially have had a rigidity or stiffness materially less than that of the combined frame and body. Thus, in a typical car sold during the year 1935 the rigidity of the frame alone was only about ten per cent of the rigidity of the combined frame and body. This invention provides a frame which is of great stiffness for its weight and which can, if desired, be made with a stiffness greater than the stiffness of the combined frame and body structures generally used up to the present time. The result of the invention when suitably applied can well be a reduction in the total weight of the car combined with an increase in rigidity. A further advantage of a rigid frame structure is that strains induced by unevenness of the road surface are absorbed by the frame so that racking and straining of the light spot welded structural body members are avoided. The result is a car which remains free from the body squeaks and rattles ordinarily introduced by torsional weave of the structure. Another advantage obtained from the elimination of this type of movement is a general improvement in the riding qualities of the car and a feeling of security and safety which does not exist in a car which is continuously vibrating or shivering.

The invention is illustrated in the drawings in a preferred embodiment. The views shown in the drawings are as follows:

Figure 1 is a perspective view of the frame;

Fig. 2 is a top plan view of the frame;

Fig. 3 is a vertical section of the X member on the line 3—3 of Fig. 2;

Fig. 9 is a vertical section on line 9—9 of Fig. 2 showing the joint between the forward arm of the X member and the side rail;

Fig. 10 is a horizontal section taken on the line 10—10 of Fig. 9;

Fig. 11 is a perspective view of an all welded type of center joint between the arms of the X member;

Fig. 12 is a horizontal section of the center joint shown in Fig. 11 taken on line 12—12 of Fig. 11; and Fig. 13 is a view illustrating the method of testing a frame for stiffness as hereinafter described.

Figure 4:
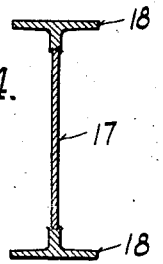
Fig. 4 is a vertical section on the line 4—4 of Fig. 2.
Figure 5:
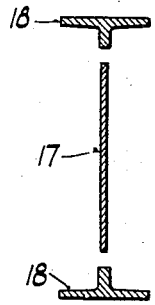
Figs. 5 and 6 illustrate a vertical section and a side elevation, respectively, of pieces suitable for use in the fabrication of I beams for the X member of my improved automobile frame.
Figure 6:
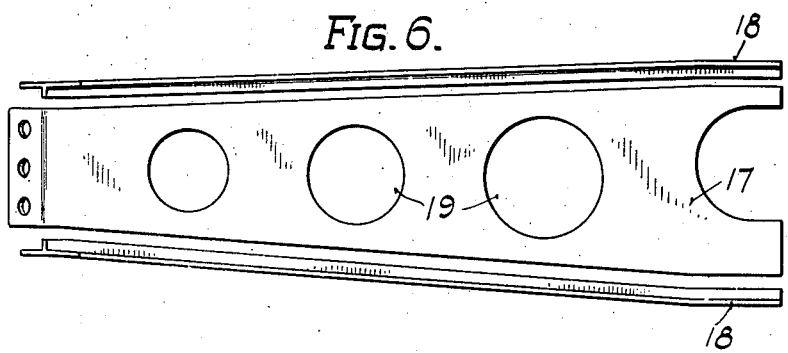
Figure 7:
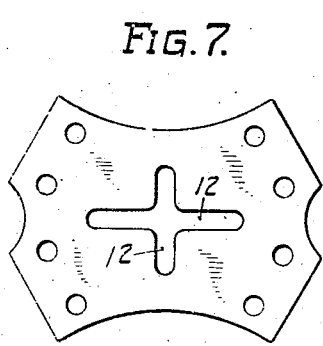
Fig. 7 illustrates a connecting plate suitable for the joining of the four members which form the X member.
Figure 8:
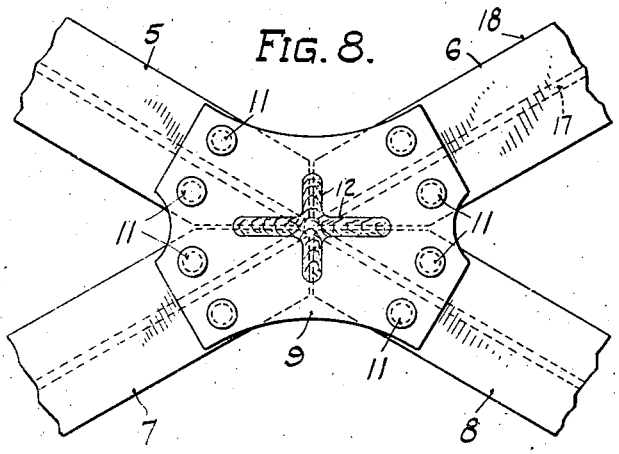
Fig. 8 is a top plan view of the center of the X member drawn to a larger scale than is used in Fig. 2.

An important feature of this invention is the provision of a frame with an X member of great stiffness formed from I beams or of sections having the characteristics of I beams. Referring to the drawings, the frame has an X member 1 and side rails 2 extending for a suitable distance to the front and rear of the X member. Cross bars 3 and 4 are provided at the front and rear ends of the frame.

The X member is made of I beams which are preferably of varying depth in order to obtain the greatest efficiency combined with lightness of weight. In the embodiment of the invention which is illustrated in the drawings, the X member is formed of four I beams 5, 6, 7 and 8. The four I beams are joined at the center of the X member by means of two center plates 9 and 10 which are placed respectively at the top and bottom of the X member. Each of the four I beams which meet at the center of the X member is riveted to the center plates 9 and 10 by rivets 11 passing through the flanges of the I beams. The center plates have two intersecting slots 12 cut through them in such a position as to be over the meeting lines of the flanges of the I beams 5, 6, 7 and 8. After the I beams have been secured to the center plates by the rivets 11, the I beams are preferably electric arc welded to each other and to the center plates through the slots 12.

An advantage of this method of forming the center connection is that when the rivet holes are properly positioned in the center plates and flanges of the I beams, the driving of the rivets will align the I beams and hold them in proper position for the subsequent welding.

A further advantage of the center connection illustrated in the drawings, is that the center plates are utilized as reenforcements for the I beam members to make up for the large hole required in the webs of the I beams for propeller shaft clearance. This form of center connection is consequently preferred, but the invention is not limited thereto since other methods of making the center connection can be used.

A modified form of center joint is illustrated in Figures 11 and 12 in which the top and bottom center plates 13 and 14 are welded at their edges 15 to the respective flanges of the I beams. The ends of the flanges of the I beams are welded together and to the respective plates along the transverse meeting lines of the flanges, as at 16, suitable notches being provided in the meeting lines of the flanges to permit the deposition of weld metal.

The I-beams used for the construction of the X member can be conveniently fabricated by electric welding from flat sheets and T-sections. The central portion of the X member is of as great depth as clearance permits to provide great stiffness and resistance to deflection by beam loads, while the outer ends of the X member are of lesser depth to permit of convenient attachment to the side members of the frame. In fabricating an I beam of varying height to be suitable for use in an X member of the above-described characteristics, the web 17 of the I beam is punched to the desired shape from a sheet of suitable gauge, and T-sections of proper thickness to form the flanges 18 of the I beam are bent into shape. The T-sections and flat web member are then welded together. Holes 19 may be punched through the web of the I beams in the X member and of the channel sections used in the side members of the frame for the purpose of decreasing its weight without seriously diminishing its rigidity.

While an I beam section is not in itself particularly effective for resisting deflection due to torsional stresses, it is resistant to deflection by beam loads. This characteristic is utilized in the construction to provide an X member resistant to deflection by torsion. If one of the two intersecting beams in the X member is supported at its two ends and a vertical load is applied to one end of the other beam, then the second beam pivots about the center of the X member. The first mentioned beam acts as a support at this point for the second beam. As a consequence the four ends of the X member remain in the same plane and provide a rigid support to which the body can be attached. From this rigid support beams can also be extended on the sides of the X member to carry forward and backward the rigidity inherent in it and to provide means for attaching the motor, rear wheels, front wheels, bumpers, and other fixtures.

In the preferred embodiment of the invention shown in the drawings the ends of the X member 1 are secured to channel-shaped side rails 2 extending longitudinally of the frame. The connection of the channel to the X member can be made either by riveting or welding. It is important that the webs of the I beams forming the arms of the X member be joined directly to the webs of the channel side rails. This is to provide a good connection resistant to the vertical shear which occurs when loads are applied at either end of the side rails. The degree of rigidity desired at the front and rear of the X member is obtained by properly proportioning the channel member. In the interest of lightness and economy of metal these members should be deep, and may have the webs lightened by holes punched out of them. Channel members 20 are provided for the purpose of stiffening the forward end of the frame, adjacent the engine, since the side rails 2 are of light construction. The members 20 have their upper and lower flanges inserted within the channel of the side rails 2 and riveted to the respective flanges of the side rails, the entire structure forming a rectangular cross section. This construction provides a certain degree of lateral and vertical rigidity to prevent undesirable transmission of vibrations.

The joint between the rear end of member 20, the side bar 2 and the forward end of the respective arm of the X member 1 is of a design effecting the maximum transmission of vertical beam loads between the members and also effectively preventing any tendency of the arms of the X member to twist. As shown in Figs. 9 and 10, the vertical height of the forward arm of the I-beam is approximately the same as the channel of side rail 2 except at the very end of the I beam, where its height is reduced so that it is inserted in the channel of the side rail 2. The flanges of the I beam are riveted to the flanges of the side rail 2. The vertical web of the I beam, at its end, is bent parallel to the web of the side rail 2 and riveted thereto. The member 20 which is of less height than the channel side rail 2 and also the body of the I beam, has its flanges inserted beneath the flanges of side rail 2 and of the I beam and riveted thereto. The vertical web of member 20 has its end bent parallel to the vertical web of the I beam and riveted thereto. A small part of the upper flange of the member 20 is bent downwardly at 21 to pass beneath the end of the flange of the I beam; and a similar part of the lower flange of member 20 is bent upwardly.

The forward end of member 20 is secured in any suitable manner to the forward cross member 3. The side rails are provided with channel reenforcements 22 at the kick-up over the rear axle. The depth of the side rails through this section is limited due to the necessity for axle clearance and the reenforcement is utilized to compensate for the shallowness of the side rails.

In the present invention the X member becomes the principal element of the frame and the other members are auxiliary to it. This is the exact opposite to the past designs. The ideal construction would be a chassis frame consisting of nothing but an X member, one beam of which would extend diagonally across the car from the left front wheel to the right rear wheel, and the other beam would extend from the right front wheel to the left rear wheel. However, because of clearance limitations and the necessity for providing supports at the ends of the springs, this is not at present practicable. The additional frame members provided in the present preferred embodiment have minor but important functions as described herein.

The side rails 2 are built of lighter weight stock than heretofore since their former function has been substantially eliminated by the new stiffener X member. The side rails now serve largely to prevent twisting of the outer ends of the arms of the X member. At the forward end of the automobile the side bar reenforces the member 20 and assists in carrying the load forward of the X member. The member 20 and its corresponding side rail 2 acts as a cantilever beam attached to the forward arm of the X member.

The proportionate gauge of the side rail 2 and member 20 is entirely different from what has heretofore been employed in chassis frames. Usually the side rail has been of heavier stock than the additional member, and the latter has served as an auxiliary member or reenforcement. In the present construction the member 20 is the heavier and is the main member, while the side rail 2 functions as the auxiliary or reenforcing member. It is preferable to have the member 20 constructed of thicker stock than the side rails 2 and in some instances 30% or more thicker than the side rails.

The central portion of each side rail 2, lying between its connections to the X member, functions chiefly as upper and lower tension and compression members tying the arms of the X member and preventing twisting of the same under loads applied through the cantilever beams extending forwardly and rearwardly of the X member.

The rear end of the side rails 2 might be dispensed with in a proper design, but are preferably utilized for convenience in assembly of the automobile for attachment of the rear springs and other auxiliary parts. Additional function depends upon the construction of the attachment of the body. Where the body of the automobile is attached rigidly at the four extremities of the ends of the X member, the rear ends of the side rails 2 may serve solely as intermediate members between the rear springs and the body. On the other hand, in case the body is attached by cushion members at the four extremities of the X member, as described hereinafter, the rear ends of the side rails may also function as cantilever beams for attaching the rear springs and will absorb road shocks.

The side rails 2 are preferably constructed of a single channel element extending for substantially the full length of the chassis frame. However, since each portion of the side rails functions differently, it is possible to utilize separate elements designed more efficiently for each specific function. At present such a construction is not preferred due to the additional manufacturing cost resulting from an increase in the number of parts and of manufacturing operations.

The rigid frame provided by this invention opens up new possibilities in the attachment of the body to the frame. With the former type of frame structure which contributes only a small part of the rigidity of the car it is necessary to have a firm and rigid attachment between the body and the frame in order that they may act together as a composite structure. The high degree of rigidity obtained with the present invention makes it possible to dispense with a rigid connection between the body and the frame. The frame is capable of taking the load without any aid from the body, which may, therefore, be supported on the frame by flexible means. This insures that minute movements or vibrations are kept from entering the body and results in smoother and quieter performance.

With this invention the vertical stiffness of the X member beams controls directly the amount of twist which is imparted to the automobile body. This is not true in cases where the X members are inefficient as beams, such as the channel section members which have been used heretofore. In prior constructions, the beams have not sufficient vertical rigidity to provide supports in this manner. They function instead largely as diagonal braces for the bottom of the body and depend upon the shearing value of the connections between the body and frame for their ability to do useful stiffening work. The removal of this shear value in the body to frame connections would greatly reduce the overall torsional stiffness of the automobile, and for this reason it has been impossible to use, heretofore, any great degree of cushioning at the frame body connections. The present invention entirely overcomes this difficulty and the body may be cushioned from all vibration.

Another method of securing the body to the frame which is made possible by this invention is to fasten the two together at five basic points. Four of these five points are at the outer ends of the four arms of the X member. These points remain in a plane because of the stiffness of the I beams forming the arms of the X member, and can be considered as fixed points. The other point of attachment is at the center line of the car at the rear end of the body. The connection at this point should be of such nature as to permit of pivotal motion of the rear end of the frame relative to the body. Clearance is provided between the frame and the body structure extending from the rear arms of the X member back to the fifth point of attachment. With this construction, when a shock occurs on one of the rear wheels the rear end of the side rails deflects sufficiently to build up its vertical resistance to a point capable of withstanding the load imposed. By virtue of the space between the side rail and the body and the pivotal connection between the body and the frame at the fifth point of attachment, the motion in the side rails takes place without transmitting torsional load into the rear of the body structure. The body structure is quite capable of withstanding the vertical load delivered to the body through the fifth point of attachment. The body is only weak torsionally; vertically the portion of the body to the rear of the X member is very efficient.

The following stiffness figures obtained by checking present-day standard chassis frames with frames designed according to the present invention to replace them, indicate what has been accomplished with the invention and show its great improvement in the ratio between stiffness and weight of frames:

| Frame | Weight | Stiffness of X member | Stiffness from forward end of X member to center line of front wheels |
| --- | --- | --- | --- |
| No. 1 standard 1935–36 | 263 lbs. | 1356 | 1360 |
| No. 2 new frame to replace No. 1 | 246 lbs. | 6708 | 2676 |
| No. 3 standard 1935–36 | 212 lbs. | 440 | 760 |
| No. 4 new frame to replace No. 3 | 170 lbs. | 3750 | 2000 |

The above tests are representative. The tests were conducted as illustrated in Fig. 13 by holding the rear end of the frame in a horizontal plane by securing it to rigid supports at 23 and 24. The middle point of the front cross bar is supported at 25, and a torque tending to turn the front end of the frame out of the horizontal plane is applied by hanging a weight 26 to a bar 27 rigidly fastened to the front end of the frame. Three bars or rods 28, 29 and 30 are secured respectively to the frame at the rear extremities of the X member, at the forward extremities of the X member, and at a line on the forward portion of the frame approximately over the center line of the front wheels. The angular deflections of the bars or rods 28, 29 and 30 are measured for different applied torques tending to twist the front end of the frame out of a horizontal plane. The number of foot-pounds of torque required to produce an angular twist 1° greater for the transverse line passing through the forward extremities of the X member than for the transverse line passing through the rear extremities of the X member is the measure of stiffness given above for the X member. Similarly, the number of foot-pounds or torque required to produce an angular twist of 1° greater for the transverse line passing through the forward end of the frame at approximately the vertical plane of the center line of the front wheels than for the transverse line passing through the forward extremities of the X member is the measure of stiffness given above in the right-hand column for the forward end of the frame.

These figures are important in evaluating the rigidity of a frame. It will be noted from the above figures that whereas in the standard frames used commercially during the last season there was a ratio of stiffness of X member to weight of frame ranging from about 2 to 5, the new frames built in accordance with the present invention had a corresponding stiffness ratio ranging from about 20 to 27. The stiffness of the X member had been increased from five to ten times, and with an actual reduction in weight of the frame. There is a corresponding increase in the ratio of the stiffness of the X member to the weight of this member. By the use of this invention it is practicable to produce an X member with a ratio of stiffness to weight in excess of 80. The new frame listed as No. 2 in the preceding tabulation had an X member weight of 57.65 pounds. This gives 116 for the ratio of the stiffness of the X member to its weight, a value which is well in excess of 80. Standard frame No. 1, which frame No. 2 was designed to replace, had an X member which weighed 31.88 pounds. For this frame the ratio of X member stiffness to weight is only 43, a value very much less than for the new frame. The increased rigidity of the X member, which is obtained by the use of this invention, is of great advantage since it is the deflection of the four points at the ends of the four arms of the X member which determines the movements transmitted to the body structure.

The rigidity of the front end of the frame is also increased by the present invention since the stiffness of the X member is carried forward through members 20 and the side rails. This is important in its effect upon the dynamic characteristics of the front end, with its front wheel suspension and engine mounting. A certain vibrational frequency is required for this part of the frame and must be determined by trial with any given automobile. The proper rigidity in the forward end of the frame may be obtained by selecting a satisfactory thickness and depth for the member 20 and for its reenforcement, the side rails 2.

Referring again to the illustrative tests given above, it will be noted that with frame No. 1 the stiffness of the X member was 1,356 foot-pounds for one degree of twist. When a standard body was rigidly attached to this frame, the combined stiffness value through this same section became 9,000 foot-pounds for one degree of twist. The body, therefore, has heretofore played a major part in providing stiffness and rigidity. But body structures, being fabricated from thin gauge materials, deteriorate rapidly when subjected to continuous racking and twisting strains, and the joints and connections in the body structure become seriously weakened. The frame of the present invention, which can have a stiffness in excess of the total combined structure formerly used, removes substantially all twisting loads from the body structure or, rather, fails to transmit such loads to the body, and the body does not deteriorate and remains free from squeaks and rattles. Furthermore, braces in the body structure used for carrying loads imparted by twisting of the body can be removed, resulting in a lighter body structure and consequently a lighter automobile.

Various modifications of the embodiments herein disclosed may be employed within the scope of the invention as set forth in the accompanying claims.

The invention is claimed as follows:

1. In an automobile chassis frame, an X member comprising four arms of I beam section meeting symmetrically at the center of the X member, and connecting plates, one plate positioned above the upper flanges of said arms and the other being positioned below the lower flanges of said arms, said connecting plates being riveted to the respective flanges of the I beam arms and having openings through which said flanges and connecting plates are welded into an integral structure.

2. In an automobile chassis frame, an X member comprising four arms of I beam section meeting symetrically at the center of the X member, a connecting plate positioned above the upper flanges of said arms, and a connecting plate positioned below the lower flanges of said arms, the meeting end edges of said arms being integrally joined by weld metal and said connecting plates being welded to the respective flanges of said arms at the outer edges of said plates and at the meeting end edges of said flanges.

3. In an automobile chassis frame, a stiff, torsionally rigid X member composed of beams of I-section and disposed rearwardly of the location of the engine, a channel member extending forwardly from the end of each forward arm of said X-member for attaching the same to the respective forward wheel, and a pair of channel shaped side rails disposed on opposite sides of said X member and reenforcing said forwardly extending members and holding said forward arms of the X member against twisting, the thickness of said forwardly extending member being greater than the thickness of said side rails.

4. In an automobile frame, a pair of channel shaped side rails having the flanges thereof disposed substantially horizontal and facing inwardly of the frame, and a stiff, torsionally rigid X member composed of beams of I-section and disposed rearwardly of the location for the engine, the center of said X member being of substantially greater depth than the depth of said side rails and the outer end extremities of said arms being of less depth and inserted within the channel of the respective side rail, the flanges of the ends of said arms being secured to the respective flanges of the side rails, and the ends of the vertical webs of said arms being bent parallel with the vertical webs of said side rails and secured thereto.

5. In an automobile frame, a pair of channel shaped side rails having the flanges thereof disposed substantially horizontal and facing inwardly of the frame, a stiff, torsionally rigid X member composed of beams of I-section and disposed rearwardly of the location for the engine, the center of said X member being of substantially greater depth than the depth of said side rails and the outer end extremities of said arms being of less depth and inserted within the channel of the respective side rail, the flanges at the ends of said arms being secured to the respective flanges of the side rails, and the ends of the vertical webs of said arms being bent parallel with the vertical webs of said side rails and secured thereto, and a channel member extending forwardly from each said forward X member arms and having its flanges inserted within the channels of the respective side rails and secured to the flanges thereof to form a rectangular frame element extending forwardly from said X member, the rear ends of said channel members extending to said forward arms of the X member and having the flanges of the channel members inserted adjacent the flanges of said arms and secured thereto and having the vertical webs of the channel members secured to the vertical webs of the respective arms, the flanges of said channel members being bent corresponding to the curvature of the flanges of said arms at the outer ends of the latter.

6. An automobile chassis frame having incorporated therein a stiff, torsionally rigid, X-cross member composed of beams of I-section rigidly connected at the center, the torsional stiffness value of said frame as measured by the torque in foot pounds required to twist the frame through one degree of angularity between transverse lines extending through the front and rear extremities, respectively, of the X-cross member, being in excess of 15 foot pounds for each pound weight of the frame.

7. An automobile chassis frame having incorporated therein a stiff, torsionally rigid, X-cross member composed of beams of I-section rigidly connected at the center, the torsional stiffness value of said frame as measured by the torque in foot pounds required to twist the frame through one degree of angularity between transverse lines extending through the front and rear extremities, respectively, of the X-cross member, being in excess of 80 foot pounds for each pound weight of the X-cross member.

8. An automobile chassis frame having incorporated therein a stiff, torsionally rigid X-cross member composed of beams of I-section rigidly connected at the center, and having a substantially greater torsional stiffness than a frame of the same weight constructed with a conventional X-cross member composed of beams of channel section formed from sheet metal.

9. An automobile chassis frame having incorporated therein a stiff, torsionally rigid, X-cross member composed of beams of I-section rigidly connected at the center, said beams having a greater depth at the center of the X-cross member than at the outer extremities of the beams and being fabricated by welding from web and flange stock, the torsional stiffness value of said frame as measured by the torque in foot pounds required to twist the frame through one degree of angularity between transverse lines extending through the front and rear extremities, respectively, of the X-cross member, being in excess of 80 foot pounds for each pound weight of the X-cross member.

10. An automobile chassis frame having incorporated therein, a stiff, torsionally rigid, X-cross member composed of beams of I-section rigidly connected at the center, and means for transmitting beam loads to the extremities of said X-cross member and for preventing the arms of said member from twisting, the torsional stiffness value of said frame as measured by the torque in foot pounds required to twist the frame through one degree of angularity between transverse lines extending through the front and rear extremities, respectively, of the X-cross member, being in excess of 80 foot pounds for each pound weight of the X-cross member.

11. An automobile chassis frame having incorporated therein a stiff, torsionally rigid, X-cross member composed of beams of I-section rigidly connected at the center, and means extending forwardly and rearwardly from the outer extremities of said X-cross member for attachment to the springs of the automobile, the torsional stiffness value of said frame as measured by the torque in foot pounds required to twist the frame through one degree of angularity between transverse lines extending through the front and rear extremities, respectively, of the X-cross member, being in excess of 80 foot pounds for each pound weight of the X-cross member.

12. In a chassis frame for high speed motor vehicles adapted to resist torsional stresses exerted on the vehicles by uneven road conditions, the combination comprising spaced side rails and a plurality of I-beam sections diverging symmetrically from a substantially common central point, said I-beam sections being rigidly joined at the substantially common central point and being of greater depth at this point than at the extremities to provide a structure characterized by a high ratio of stiffness to weight and adapted to substantially prevent twisting of said chassis frame as uneven road conditions are encountered, the torsional rigidity of the structure being substantially greater than that of a similar structure of the same weight of conventional channel section, the outer extremities of the I-beam sections being rigidly joined to the side rails intermediate their ends, and means including said side rails for supporting said frame on the springs of the motor vehicle.

DONALD W. SHERMAN.